United States Patent
Booth et al.

(10) Patent No.: US 8,463,473 B2
(45) Date of Patent: Jun. 11, 2013

(54) CHARGE UTILIZATION CONTROL SYSTEM AND METHOD

(75) Inventors: Lewis Booth, Birmingham, MI (US); Dale Scott Crombez, Livonia, MI (US); Daniel A. Gabor, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 679 days.

(21) Appl. No.: 12/684,955

(22) Filed: Jan. 10, 2010

(65) Prior Publication Data

US 2011/0166725 A1 Jul. 7, 2011

(51) Int. Cl.
*B60L 9/00* (2006.01)

(52) U.S. Cl.
USPC .............. 701/22; 903/903; 180/65.265

(58) Field of Classification Search
USPC ..... 701/22, 408; 180/65.265, 65.75; 903/903, 903/907
See application file for complete search history.

(56) References Cited

U.S. PATENT DOCUMENTS

| | | | |
|---|---|---|---|
| 5,778,326 A * | 7/1998 | Moroto et al. | 701/22 |
| 6,381,522 B1 * | 4/2002 | Watanabe et al. | 701/22 |
| 6,487,477 B1 * | 11/2002 | Woestman et al. | 701/22 |
| 6,629,027 B2 | 9/2003 | Yamaguchi et al. | |
| 6,687,581 B2 * | 2/2004 | Deguchi et al. | 701/22 |
| 7,013,205 B1 * | 3/2006 | Hafner et al. | 701/22 |
| 7,360,615 B2 * | 4/2008 | Salman et al. | 180/65.265 |
| 7,958,958 B2 * | 6/2011 | de la Torre Bueno | 180/65.29 |
| 8,190,318 B2 * | 5/2012 | Li et al. | 701/22 |
| 2002/0069000 A1 | 6/2002 | Nakao | |
| 2002/0188387 A1 * | 12/2002 | Woestman et al. | 701/22 |
| 2009/0114463 A1 * | 5/2009 | DeVault | 180/65.29 |
| 2009/0259363 A1 * | 10/2009 | Li et al. | 701/36 |
| 2010/0217467 A1 * | 8/2010 | de la Torre Bueno | 701/22 |
| 2010/0256846 A1 * | 10/2010 | Shaffer | 701/22 |

FOREIGN PATENT DOCUMENTS

| | | |
|---|---|---|
| EP | 1842757 A1 | 4/2006 |
| EP | 1975028 A2 | 10/2008 |
| JP | 2007050888 A | 9/2006 |
| JP | 2008201165 A | 2/2007 |

* cited by examiner

*Primary Examiner* — Helal A Algahaim
(74) *Attorney, Agent, or Firm* — David Kelley, Esq.; Tung & Associates

(57) ABSTRACT

A charge utilization control system for an electric vehicle includes a controller, an electric motor connected to the controller, a battery connected to the electric motor and an internal combustion engine connected to the controller. The controller is adapted to minimize electric charge stored in the battery as the electric vehicle approaches a charging destination for the battery.

15 Claims, 3 Drawing Sheets

CHARGE UTILIZATION CONTROL SYSTEM AND METHOD

TECHNICAL FIELD

The present disclosure generally relates to electric vehicles. More particularly, the present disclosure is generally directed to a charge utilization control system and method which facilitates increased utilization of electrical charge stored in a vehicle battery and reduced or terminated fuel consumption as the vehicle approaches a charging destination.

BACKGROUND

Electric vehicles such as plug-in hybrid electric vehicles (HEVs) may include an internal combustion engine and an electric motor which provide locomotion to the vehicle. A rechargeable battery may be connected to the electric motor to supply electrical current to the motor. A controller connected to the engine and the motor may be programmed to apportion or balance the amount of torque which is provided by the engine and the motor to the wheels of the vehicle during vehicle operation. Due to the drive assistance which is provided by the electric motor, operation of an HEV may be more fuel efficient than operation of vehicles which utilize an internal combustion engine only.

The battery of a plug-in HEV is periodically recharged with electrical power at the home or office of the vehicle operator or at some other charging destination. Currently, however, for various reasons such as vehicle performance, vehicle drivability, battery charge balance, or other reasons known to those skilled in the art, utilization of the internal combustion engine of the HEV may continue throughout all charging conditions of the vehicle battery, even as the vehicle approaches the charging destination. Although utilization of the internal combustion engine may be justified during most driving conditions, it may needlessly result in excess fuel consumption if off board charging is imminent.

Therefore, a charge utilization control system and method which facilitate increased utilization of electrical charge stored in a vehicle battery and reduced or terminated fuel consumption as the vehicle approaches a charging destination are needed to conserve fuel.

SUMMARY

The present disclosure is generally directed to a charge utilization control system for an electric vehicle. An illustrative embodiment of the charge utilization control system includes a controller, an electric motor connected to the controller, a battery connected to the electric motor and an internal combustion engine connected to the controller. The controller is adapted to minimize electric charge stored in the battery as the electric vehicle approaches a charging destination for the battery.

The present disclosure is further generally directed to an electric vehicle. An illustrative embodiment of the electric vehicle includes a chassis; a first axle and a second axle carried by the chassis; a first pair of wheels and a second pair of wheels carried by the first axle and the second axle, respectively; at least one electric motor drivingly engaging at least one of the axles; an internal combustion engine providing power indirectly or directly to at least one of said axles; a battery connected to the electric motor; and at least one controller connected to the internal combustion engine and the electric motor. The controller is adapted to minimize electric charge stored in the battery and at least reduce operation of the internal combustion engine as the electric vehicle approaches a charging destination for the battery.

The present disclosure is further generally directed to a charge utilization control method for an electric vehicle. An illustrative embodiment of the method includes charging a battery of the electric vehicle, operating the electric vehicle, approaching a charging destination, operating an electric motor of the electric vehicle to minimize a battery charge remaining in the battery, at least reducing operation of an internal combustion engine of the electric vehicle and arriving at the charging destination.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. Furthermore, there is no intention to be bound by any expressed or implied theory presented in the preceding technical field, background, brief summary or the following detailed description.

Figure 1:
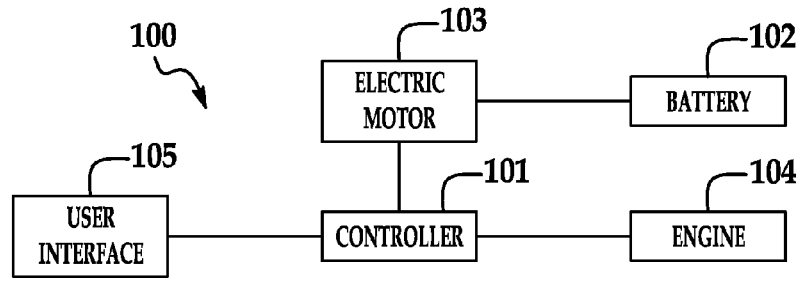
FIG. 1 is a block diagram of an illustrative embodiment of the charge utilization control system.
Figure 2:
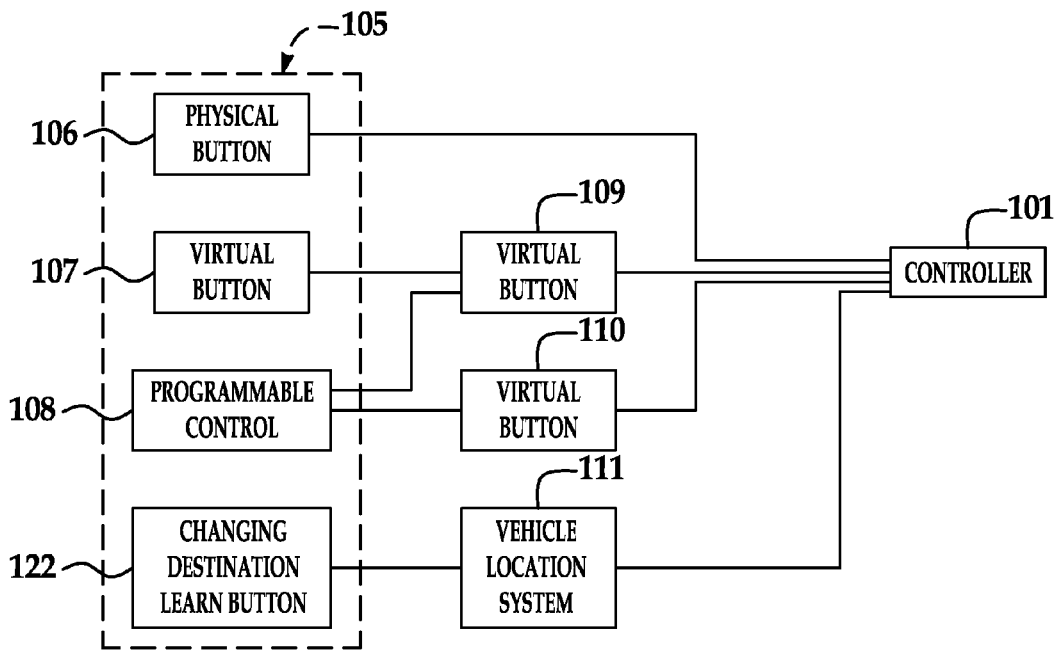
FIG. 2 is a block diagram of a user interface of an illustrative embodiment of the charge utilization control system.
Figure 3:
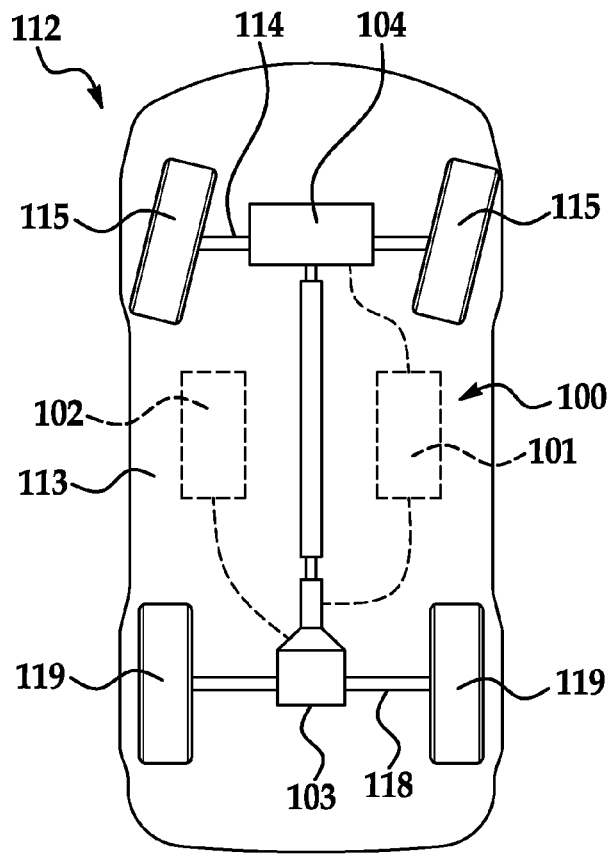
FIG. 3 is a schematic diagram of a hybrid electric vehicle fitted with an illustrative embodiment of the charge utilization control system.

Referring initially to FIGS. 1-3, an illustrative embodiment of the charge utilization control system, hereinafter system, is generally indicated by reference numeral 100 in FIG. 1. As shown in FIG. 3, the system 100 may be suitable for implementation in conjunction with an electric vehicle 112 such as a plug-in hybrid electric vehicle (HEV). Generally, the electric vehicle 112 may include a vehicle chassis 113 having a first axle 114 fitted with a first pair of wheels 115 and a second axle 118 fitted with a second pair of wheels 119. An internal combustion engine 104 may drivingly engage the first axle 114. An electric motor 103 may drivingly engage the second axle 118. A rechargeable battery 102 may be connected to the electric motor 103. The rechargeable battery 102 may be capable of being recharged with electrical power at a charging destination (not shown) via suitable plug-in electrical equipment, as is known to those skilled in the art.

The electric vehicle 112 may be adapted for propulsion by the internal combustion engine 104 via the first axle 114 and the first pair of wheels 115 and/or by the electric motor 103 via the second axle 118 and the second pair of wheels 119. As will be hereinafter described, the system 100 may be adapted to enter a battery charge depletion mode which may or may not include limiting or inhibiting operation of the internal combustion engine 104, increasing usage of the electric motor 103, and scheduling usage of all power sources to provide optimum vehicle performance while ensuring that the battery charge will be minimized or substantially depleted as the electric vehicle 112 reaches the charging destination as the electric vehicle 112 approaches or becomes within a predetermined range of a charging destination (not shown) for the battery 102. The charge depletion mode may facilitate enhanced fuel efficiency of the electric vehicle 112 by avoiding the need to utilize the internal combustion engine 104 as the electric vehicle 112 approaches the charging destination.

As shown in FIG. 1, the system 100 may include a controller 101 which is connected to the electric motor 103 and to the internal combustion engine 104 of the electric vehicle 112. The controller 101 may be adapted to apportion or balance the magnitude or fraction of torque which is provided by the internal combustion engine 104 and the electric motor 103 to the first pair of wheels 115 and the second pair of wheels 119, respectively, of the electric vehicle 112 during vehicle operation. A user interface 105 may be connected to the controller 101 of the system 100 to provide direct and/or programmed control of the controller 101 to an operator (not shown) of the electric vehicle 112. As shown in FIG. 2, in some embodiments the user interface 105 may include a physical button 106 which may be provided on a dashboard (not shown) in the passenger cabin (not shown) or in any other suitable location of the electric vehicle 112. Upon manual depression of the physical button 106, the controller 101 may be adapted to cause the system 100 to enter a battery charge depletion mode which may utilize or increase utilization of the electrical charge which is stored in the battery 102 to operate the electric motor 103 for propulsion of the electric vehicle 112. The controller 101 may additionally be adapted to reduce or terminate operation of the internal combustion engine 104 to prevent further consumption of fuel by the electric vehicle 112, as will be hereinafter further described. Therefore, under circumstances in which the operator of the electric vehicle 112 intends to drive the electric vehicle 112 to the charging destination for recharging of the battery 102, the operator may depress the physical button 106 as the electric vehicle 112 approaches the charging destination in order to conserve fuel during that final segment of the trip.

As further shown in FIG. 2, in some embodiments of the system 100, the user interface 105 may include a virtual button 107 which may be part of a touch screen 109 provided on a dashboard (not shown) or in any other suitable location of the electric vehicle 112. Upon manual actuation of the virtual button 107, the controller 101 may be adapted to enter into a battery charge depletion mode and may be adapted to utilize electrical charge which is stored in the battery 102 to operate the electric motor 103. The controller 101 may additionally be adapted to reduce or terminate operation of the internal combustion engine 104, as was heretofore described with respect to operation of the physical button 106.

As further shown in FIG. 2, in some embodiments, the user interface 105 may include a programmable control 108 which may be part of a positioning system 110 provided on a dashboard (not shown) or in any other suitable location of the electric vehicle 112. Accordingly, via the programmable control 108, the location of the charging destination for the electric vehicle 112 may be programmed into the positioning system 110. In some applications, under circumstances in which the electric vehicle 112 is operated from outside a preprogrammed distance or range to within the preprogrammed distance or range of the charging destination, the positioning system 110 may be adapted to transmit an activation signal (not shown) to the controller 101 which causes the controller 101 to utilize a battery charge depletion mode which may or may not include limiting or inhibiting operation of the internal combustion engine 104, increasing usage of the electric motor 103, and scheduling usage of all power sources to provide optimum vehicle performance while ensuring that the battery charge will be minimized or substantially depleted as the electric vehicle 112 reaches the charging destination. In some applications, the positioning system 110 may be adapted to transmit the activation signal to the controller 101 under circumstances in which the electric vehicle 112 begins to follow a preprogrammed route to the charging destination.

As further shown in FIG. 2, in some embodiments, the user interface 105 may include a charging destination learn button 122 which may be part of an automatic vehicle location system 111 that interfaces with the controller 101. The automatic vehicle location system 111 may include a global positioning system (GPS) or any other system which automatically recognizes the location of the electric vehicle 112 relative to a charging destination for the electric vehicle 112. The charging destination learn button 122 may be actuated to place the vehicle location system 111 in a learning mode in which the vehicle location system 111 "learns" one or multiple charging destinations for the electric vehicle 112 as the electric vehicle 112 is recharged at those destinations over a period of time. In some embodiments, the charging destination learn button 122 may be a physical button provided on the dashboard or other location in the electric vehicle 112. In other embodiments, the charging destination learn button 122 may be part of the touch screen 109. In yet another embodiment, the vehicle location system 111 may be put into a learning mode automatically, thus not requiring input from a charging destination learn button 122. In such a case, the charging destination may be learned or inferred by considering a plurality of information assembled from, but not limited to, the vehicle location system 111 and the battery charging equipment (not shown). Accordingly, under circumstances in which the electric vehicle 112 approaches one of the learned charging destination, the vehicle location system 111 may automatically recognize that the electric vehicle 112 is approaching the charging destination and may be adapted to transmit an activation signal (not shown) to the controller 101. In response, the controller 101 may enter the charge depletion mode and utilize the electrical charge which is stored in the battery 102 in operation of the electric motor 103 and may additionally be adapted to reduce or terminate operation of the internal combustion engine 104. In some applications, the vehicle location system 111 may be adapted to prompt the driver (not shown) of the electric vehicle 112 to confirm that the electric vehicle 112 is approaching the charging destination. This expedient may prevent or minimize the possibility that the system 100 enters the charge depletion mode under circumstances in which this is not desirable.

In typical use of the system 100, the battery 102 is initially charged prior to operation of the electric vehicle 112. In embodiments in which the user interface 105 includes the physical button 106 and/or the virtual button 107, when the electric charge stored in the battery 102 has been reduced to the point at which recharging of the battery 102 is necessary, the operator of the electric vehicle 100 may manually depress the physical button 106 or touch the virtual button 107 on the touch screen 109 of the user interface 105 as the electric vehicle 112 approaches the charging destination for the battery 102. Consequently, the controller 101 enters the battery charge depletion mode and may facilitate utilization of the electric charge which remains in the battery 102 to drive the electric motor 103. The controller 101 may additionally reduce or terminate operation of the internal combustion engine 104 of the electric vehicle 112 and may ensure that the battery charge is minimized or substantially depleted as the electric vehicle 112 reaches the charging destination. Therefore, the electric motor 103 may be propelled via operation of the electric motor 103 while the internal combustion engine 104 may not be operated or may be operated at a reduced level in order to conserve fuel as the electric vehicle 100 approaches the charging destination. Upon arrival of the electric vehicle 112 at the charging destination, the electric vehicle 112 may be charged using conventional charging equipment.

In embodiments of the system 100 in which the user interface 105 includes the programmable control 108 as part of the positioning system 110, the operator of the electric vehicle 112, through the programmable control 108, may program the location of the charging destination for the electric vehicle 112 into the positioning system 110. In some applications, the electric vehicle 112 may be operated from outside a preprogrammed distance or range to within the preprogrammed distance or range of the charging destination. Accordingly, the positioning system 110 causes the controller 101 to enter the battery charge depletion mode and may utilize the electrical charge which remains in the battery 102 to propel the electric vehicle 112 via operation of the electric motor 103 and may additionally reduce or terminate operation of the internal combustion engine 104 while ensuring that the battery charge will be minimized or substantially depleted as the electric vehicle 112 reaches the charging destination. In some applications, a route to the charging destination may be preprogrammed into the positioning system 110. Under circumstances in which the electric vehicle 112 begins to follow the preprogrammed route to the charging destination, the positioning system 110 may cause the controller 101 to utilize the electrical charge which remains in the battery 102 to propel the electric vehicle 112 via operation of the electric motor 103 and may reduce or terminate operation of the internal combustion engine 104.

In embodiments of the system 100 in which the user interface 105 includes the charging destination learn button 122, upon actuation of the charging destination learn button 122, the vehicle location system 111 may enter a "learning mode" in which the vehicle location system 111 learns one or multiple charging destinations for the electric vehicle 112 as the electric vehicle 112 is recharged at those locations over a period of time. After it learns the charging destinations for the electric vehicle 112, the vehicle location system 111 may automatically recognize that the electric vehicle 112 is approaching a charging destination for the electric vehicle 112. Accordingly, the vehicle location system 111 may cause the controller 101 to enter the battery charge depletion mode and utilize the electrical charge which remains in the battery 102 to propel the electric vehicle 112 via operation of the electric motor 103 and may reduce or terminate operation of the internal combustion engine 104 while ensuring that the battery charge is minimized or substantially depleted as the electric vehicle 112 reaches the charging destination. In some applications, the vehicle location system 111 may provide a prompt to the driver of the electric vehicle 112 which enables the driver to confirm that a charging destination is approaching. Accordingly, the driver has the option of preventing the system 100 from entering a charge depletion mode under circumstances in which this is not desired.

In embodiments of the system 100 in which the controller 101 includes an inferred learned charging destination, upon actuation of the inferred charging destination, the vehicle location system 111 may enter a "learning mode" in which the vehicle location system 111 learns one or multiple charging destinations for the electric vehicle 112 as the electric vehicle 112 is recharged at those locations over a period of time. After it learns the charging destinations for the electric vehicle 112, the vehicle location system 111 may automatically recognize that the electric vehicle 112 is approaching a charging destination for the electric vehicle 112. Accordingly, the vehicle location system 111 may cause the controller 101 to enter the battery charge depletion mode and utilize the electrical charge which remains in the battery 102 to propel the electric vehicle 112 via operation of the electric motor 103 and may reduce or terminate operation of the internal combustion engine 104 while ensuring that the battery charge is minimized or substantially depleted as the electric vehicle 112 reaches the charging destination. In some applications, the vehicle location system 111 may provide a prompt to the driver of the electric vehicle 112 which enables the driver to confirm that a charging destination is approaching. Accordingly, the driver has the option of preventing the system 100 from entering a charge depletion mode under circumstances in which this is not desired.

Figure 4:
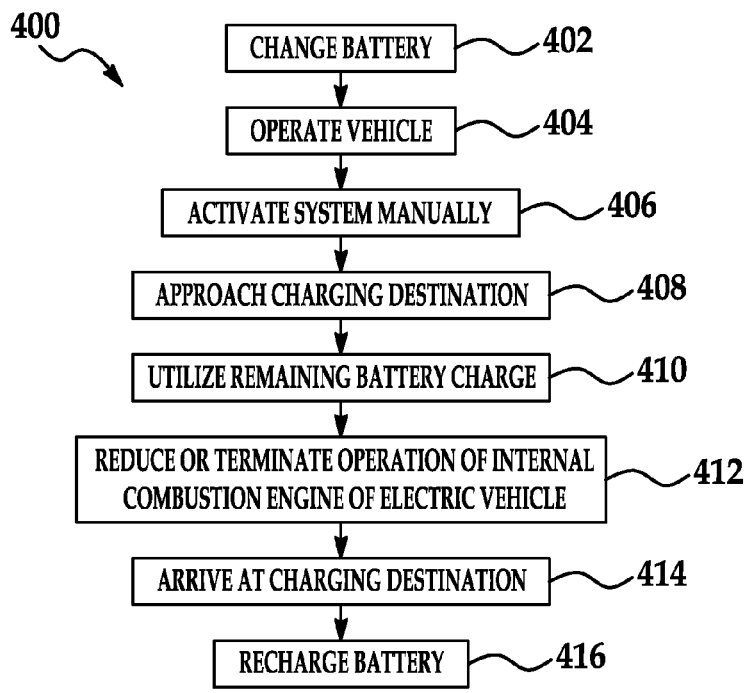
FIG. 4 is a flow diagram of an illustrative embodiment of a charge utilization control method in which the charge utilization control system is activated manually.

Referring next to FIG. 4, a flow diagram 400 of an illustrative embodiment of the charge utilization control method is shown. In block 402, a battery of an electric vehicle is charged. In block 404, the electric vehicle is operated. In block 406, a charge utilization control system of the electric vehicle is activated manually. In some embodiments, the charge utilization control system may be activated by depression of a physical button. In some embodiments, the charge utilization control system may be activated by touching a touch screen. In block 408, a charging destination for the battery is approached. In block 410, a remaining electrical charge in the battery may be utilized to operate an electric motor of the electric vehicle and minimize the battery charge as the electric vehicle reaches the charging destination. In block 412, operation of an internal combustion engine of the electric vehicle may be reduced or terminated. In block 414, the electric vehicle arrives at the charging destination. In block 416, the battery is recharged at the charging destination.

Figure 5:
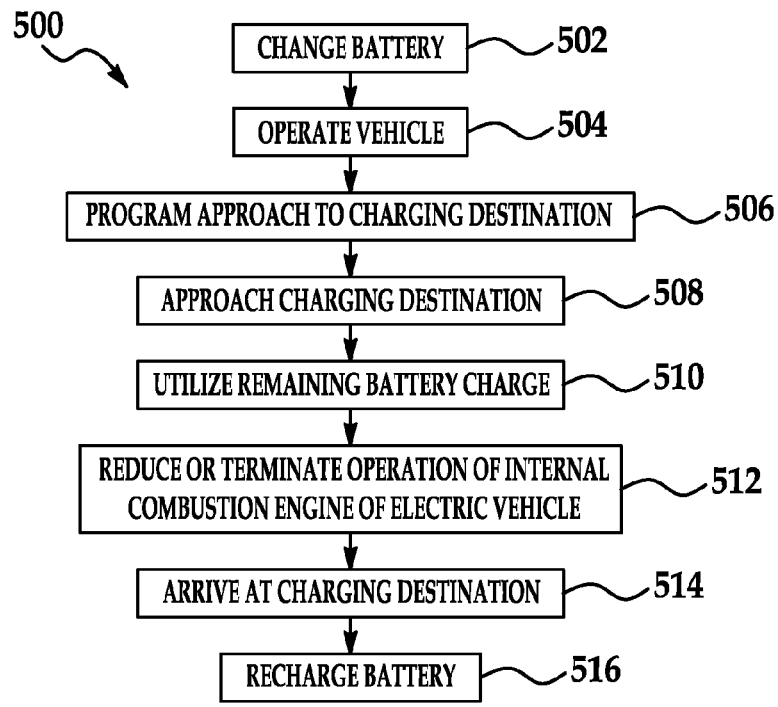
FIG. 5 is a flow diagram of an alternative illustrative embodiment of a charge utilization control method in which the charge utilization control system is activated by programming an approach to a charging destination into a controller.

Referring next to FIG. 5, a flow diagram 500 of an alternative illustrative embodiment of the charge utilization control method is shown. In block 502, a battery of an electric vehicle is charged. In block 504, the electric vehicle is operated. In block 506, an approach to a charging destination for the battery is programmed. In some embodiments, the approach to the charging destination may be programmed by programming the location of the charging destination into a positioning system onboard the electric vehicle. In block 508, the charging destination for the battery is approached. In block 510, a remaining electrical charge in the battery may be utilized to operate an electric motor of the electric vehicle and minimize the battery charge as the electric vehicle reaches the charging destination. In block 512, operation of an internal combustion engine of the electric vehicle may be reduced or terminated. In block 514, the electric vehicle arrives at the charging destination. In block 516, the battery is recharged at the charging destination.

Figure 6:
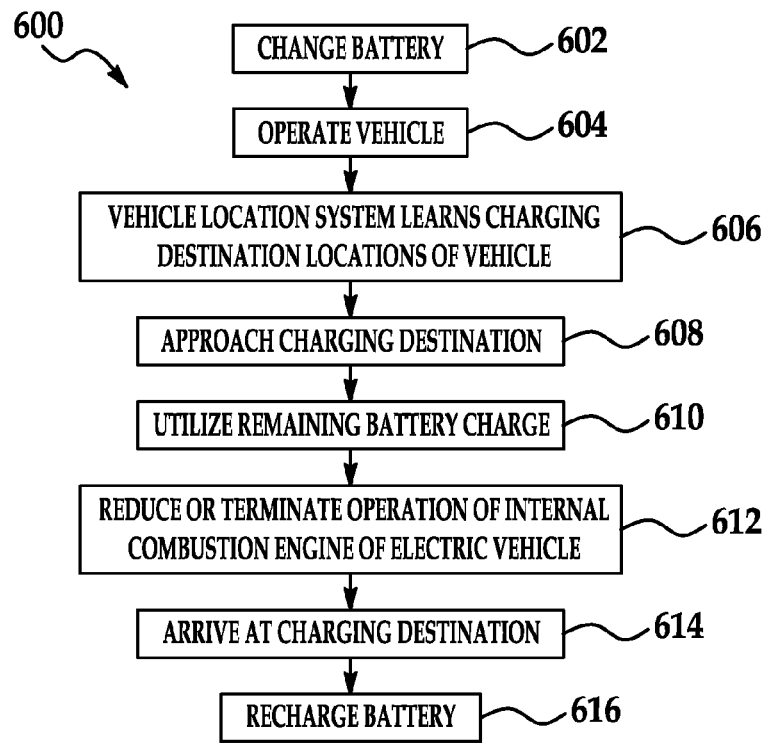
FIG. 6 is a flow diagram of an alternative illustrative embodiment of a charge utilization control method in which the charge utilization control system is activated by a vehicle location system which recognizes an approach of a vehicle to the charging destination.

Referring next to FIG. 6, a flow diagram 600 of an alternative illustrative embodiment of the charge utilization control method is shown. In block 602, a battery of an electric vehicle is charged. In block 604, the electric vehicle is operated. In block 606, a vehicle location system learns at least one charging destination location of the electric vehicle. In block 608, a charging destination for the battery is approached. In block 610, a remaining electrical charge in the battery may be utilized to operate an electric motor of the electric vehicle and minimize the battery charge as the electric vehicle reaches the charging destination. In block 612, operation of an internal combustion engine of the electric vehicle may be reduced or terminated. In block 614, the electric vehicle arrives at the charging destination. In block 616, the battery is recharged at the charging destination.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A charge utilization control system for an electric vehicle, comprising:
   a controller configured to execute programmed instructions stored in controller readable memory;
   an electric motor connected to said controller;
   a battery connected to said electric motor;
   a vehicle location system connected to said controller and wherein said controller is programmed to learn a location of said charging destination and wherein said vehicle location system automatically determines that said vehicle is approaching said charging destination;
   an internal combustion engine connected to said controller; and
   wherein said controller is configured to minimize electric charge stored in said battery including substantial charge depletion as the electric vehicle approaches a charging destination for said battery, said electric charge minimization comprising apportioning a relatively greater proportion of torque provided by said electric motor to said electric vehicle compared to said internal combustion engine.

2. The system of claim 1 further comprising a user interface connected to said controller, said user interface configured to respond to interaction to control said controller.

3. An electric vehicle, comprising:
   a chassis;
   a first axle and a second axle carried by said chassis;
   a first pair of wheels and a second pair of wheels carried by said first axle and said second axle, respectively;
   at least one electric motor drivingly engaging at least one of said axles;
   an internal combustion engine providing power indirectly or directly to at least one of said axles;
   a battery connected to said electric motor;
   a vehicle location system connected to said controller and wherein said controller is programmed to learn a location of said charging destination and wherein said vehicle location system automatically determines that said vehicle is approaching said charging destination;
   at least one controller connected to said internal combustion engine and said electric motor, said controller configured to execute programmed instructions stored in controller readable memory; and
   wherein said at least one controller is configured to minimize electric charge stored in said battery including substantial charge depletion and at least reduce a proportion of torque provided by said at least one electric motor to said electric vehicle compared to torques provided by said internal combustion engine as said electric vehicle approaches a charging destination for said battery.

4. The electric vehicle of claim 3 further comprising a user interface connected to said controller, said user interface configured to respond to interaction to control said controller.

5. The electric vehicle of claim 4 further comprising a positioning system connected to said controller and said user interface comprises a programmable control connected to said positioning system or said controller.

6. The electric vehicle of claim 4 further comprising a vehicle location system connected to said controller and wherein said user interface comprises a manually activated charging destination learn function connected to said vehicle location system or said controller, said learn function configured to cause the vehicle location system or said controller to learn the location of said charging destination wherein said vehicle location system automatically determines that said vehicle is approaching said charging destination.

7. The electric vehicle of claim 3 further comprising a vehicle location system connected to said controller and wherein said controller is configured to automatically learn a charging destination and wherein said vehicle location system automatically determines that said vehicle is approaching said charging destination.

8. A charge utilization control method for an electric vehicle, comprising:
   charging a battery of said electric vehicle;
   operating said electric vehicle;
   approaching a charging destination for said battery;
   operating an electric motor of said electric vehicle to minimize a battery charge remaining in said battery including substantial charge depletion as said electric vehicle approaches said charging destination, said operating comprising a controller executing programmed instructions stored in controller readable memory;
   a vehicle location system connected to said controller and wherein said controller is programmed to learn a location of said charging destination and wherein said vehicle location system automatically determines that said vehicle is approaching said charging destination;
   said operating further comprising increasing a proportion of torque provided to said vehicle by said electric motor and at least reducing a proportion of torque provided to said vehicle by an internal combustion engine of said electric vehicle as said electric vehicle approaches said charging destination.

9. The method of claim 8 wherein said operating an electric motor of said electric vehicle comprises connecting said controller to said electric motor, connecting a user interface to said controller and manually activating said user interface to control said controller.

10. The method of claim 8 wherein said operating an electric motor of said electric vehicle comprises connecting said controller to said electric motor, connecting a user interface comprising a positioning system having a programmable control to said controller and programming an approach to said charging destination into said positioning system using said programmable control wherein said vehicle location system automatically determines that said vehicle is approaching said charging destination.

11. The method of claim 8 wherein said operating an electric motor of said electric vehicle comprises connecting said controller to said electric motor, connecting a vehicle location system to said controller and having said vehicle location system or controller automatically learn at least one charge destination for said electric wherein said vehicle location system automatically determines that said vehicle is approaching said charging destination.

12. The method of claim 11 wherein said operating an electric motor of said electric vehicle further comprises a user interface having a manually activated charging destination learning function connected to said vehicle location system or said controller and having said vehicle location system or controller learn at least one charge destination for said electric vehicle using said charging destination learn function, wherein said vehicle location system automatically determines that said vehicle is approaching said charging destination.

13. The system of claim 1 wherein said electric vehicle comprises said engine drivingly engaging a first axle and a first pair of wheels and said electric motor drivingly engaging a second axle and a second pair of wheels.

14. The system of claim 3 wherein said electric vehicle comprises said engine drivingly engaging said first axle and said first pair of wheels and said electric motor drivingly engaging said second axle and said second pair of wheels.

15. The method of claim 8 wherein said electric vehicle comprises said engine drivingly engaging a first axle and a first pair of wheels and said electric motor drivingly engaging a second axle and a second pair of wheels.

* * * * *